US009552189B1

United States Patent
Langhammer et al.

(10) Patent No.: US 9,552,189 B1
(45) Date of Patent: Jan. 24, 2017

(54) EMBEDDED FLOATING-POINT OPERATOR CIRCUITRY

(71) Applicant: Altera Corporation, San Jose, CA (US)

(72) Inventors: Martin Langhammer, Salisbury (GB); Bogdan Pasca, Chesham (GB)

(73) Assignee: Altera Corporation, San Jose, CA (US)

( * ) Notice: Subject to any disclaimer, the term of this patent is extended or adjusted under 35 U.S.C. 154(b) by 205 days.

(21) Appl. No.: 14/497,250

(22) Filed: Sep. 25, 2014

(51) Int. Cl.
*G06F 7/556* (2006.01)
*G06F 7/483* (2006.01)
*G06F 17/10* (2006.01)

(52) U.S. Cl.
CPC .............. *G06F 7/483* (2013.01); *G06F 17/10* (2013.01); *G06F 2207/483* (2013.01)

(58) Field of Classification Search
None
See application file for complete search history.

(56) References Cited

U.S. PATENT DOCUMENTS

| 5,831,878 | A | * | 11/1998 | Ishida | ............... | H03M 7/50 |
| | | | | | | 708/204 |
| 5,974,436 | A | * | 10/1999 | Inoue | ............... | G06F 7/5525 |
| | | | | | | 708/606 |
| 8,051,118 | B2 | | 11/2011 | Lundvall et al. | | |
| 8,051,119 | B2 | | 11/2011 | Lundvall et al. | | |
| 8,082,282 | B2 | | 12/2011 | Lundvall et al. | | |
| 8,423,595 | B2 | | 4/2013 | Lundvall et al. | | |
| 8,468,184 | B2 | | 6/2013 | Lundvall et al. | | |
| 8,762,438 | B2 | | 6/2014 | Lundvall et al. | | |
| 2003/0163502 | A1 | * | 8/2003 | Abe | ............... | G06F 1/0307 |
| | | | | | | 708/606 |
| 2009/0037504 | A1 | * | 2/2009 | Hussain | ............... | G06F 7/556 |
| | | | | | | 708/277 |

* cited by examiner

*Primary Examiner* — David H Malzahn
(74) *Attorney, Agent, or Firm* — Jason Tsai

(57) ABSTRACT

Circuitry that performs floating-point operations on an integrated circuit is provided. The circuitry may execute a floating-point operation by decomposing the floating-point operation into multiple steps and decomposing the floating-point number on which to perform the floating-point operation into multiple portions. The circuitry may include storage circuits that store at least some results of the multiple steps, and memory access operations may be performed using some portions of the floating-point number. The circuitry may use arithmetic floating-point and arithmetic fixed-point circuits to implement Taylor series expansion circuits that may perform a subset of the multiple steps, thereby reducing the complexity of the subset of these steps.

36 Claims, 11 Drawing Sheets

EMBEDDED FLOATING-POINT OPERATOR CIRCUITRY

BACKGROUND

This invention relates to integrated circuits and, more particularly, to circuitry that performs floating-point operations on an integrated circuit.

Floating-point numbers are commonplace for representing real numbers in scientific notation in integrated circuits thanks to a desirable balance between numeric range and precision. Floating-point numbers are typically represented in binary format in accordance with the IEEE754 standard, which defines a floating-point number as consisting of a sign, a mantissa, and an exponent.

Elementary operations such as the natural exponential function or the natural logarithmic function are frequently performed on floating-point numbers. The implementation of these operations in digital circuits often use polynomial approximation methods that combine small tables and branching with arithmetic floating-point operation such as addition, subtraction, and multiplication.

However, polynomial approximation methods of elementary operations often require a large amount of latency and use many device resources. Therefore, a more efficient support for elementary operations such as the natural exponential function and the natural logarithmic function and similarly resource intensive floating-point operations may be desirable.

SUMMARY

Embodiments relate to integrated circuits and, more particularly, to circuitry that performs floating-point operations on an integrated circuit. The circuitry may execute a floating-point operation by first decomposing the floating-point operation into multiple steps. The circuitry may also receive a floating-point number on which to perform the floating-point operation and store results of an intermediate step of the multiples steps in a storage circuit at addresses that are based at least in part on the floating-point number.

For example, the floating-point number may be decomposed into at least two floating-point number portions, and one of the at least two floating-point number portions may be used to retrieve an additional floating-point number that represents the intermediate result for the floating-point number from the storage circuit. If desired, the address of the intermediate result in the storage circuit may be determined by encoding the portion of the floating-point number portions.

It is appreciated that the present invention can be implemented in numerous ways, such as a process, an apparatus, a system, a device, instructions on a computer readable medium. Several inventive embodiments of the present invention are described below.

In certain embodiments, the circuitry may perform an arithmetic floating-point operation on the retrieved additional floating-point number and the floating-point number. The arithmetic floating-point arithmetic operation may be a floating-point addition, a floating-point subtraction, a floating-point multiplication, or a floating-point division.

In other cases, the circuitry may perform a logic operation on the retrieved additional floating-point number and on one of the at least two floating-point number portions.

Further features of the invention, its nature and various advantages, will be more apparent from the accompanying drawings and the following detailed description of the preferred embodiments.

DETAILED DESCRIPTION

Embodiments relate to integrated circuits and, more particularly, to circuitry that performs floating-point operations on an integrated circuit.

The floating-point format is one of the most common ways of representing real numbers in computer systems. Fixed-point number systems have a very limited window of representation which prevents them from representing very large or very small numbers simultaneously. For example, a fixed-point number of format Q(23.8) is represented using 32 bits. Twenty three bits are used for the integer part, eight bits are used for the fractional part, and one bit is used as a sign bit. This format may only represent integer values in the range from $-2^{23}$ to $2^{23}-2^{(-8)}$ (i.e., from $-8,388,608$ to $8,388,607.99609375$) with a resolution of $2^{(-8)}$ (i.e., 0.00390625).

The position of the notional binary point in fixed-point numbers addresses this numeric range problem to a certain extent but does so at the expense of precision. With a floating-point number, the window of representation can move, which allows the appropriate amount of precision for the scale of the number.

Floating-point representation provides a balance between numeric range and precision. Therefore, floating-point representation is generally preferred over fixed-point representation in computing systems. However, floating-point representation requires more complex implementation compared to fixed-point representation.

Floating-point numbers and the corresponding floating-point operations are often implemented in accordance with the IEEE754 standard, which defines a floating-point number as including a sign, a mantissa, and an exponent, where the mantissa is required to be normalized at all times because the standard implies a leading "1."

Floating-point numbers may be processed by floating-point units that perform different floating-point operations. Examples of arithmetic floating-point operations executed by floating-point units may include addition, subtraction, multiplication, division, and square root. Efficient implementation of other floating-point operations such as the natural exponential function or the natural logarithmic function are generally desirable because the natural exponential function and the natural logarithmic function are among the most complex floating-point operations and typically use a disproportionate amount of device resources compared to arithmetic floating-point operations.

It will be obvious to one skilled in the art, that the present exemplary embodiments may be practiced without some or all of these specific details. In other instances, well-known operations have not been described in detail in order not to unnecessarily obscure the present embodiments.

Figure 1:
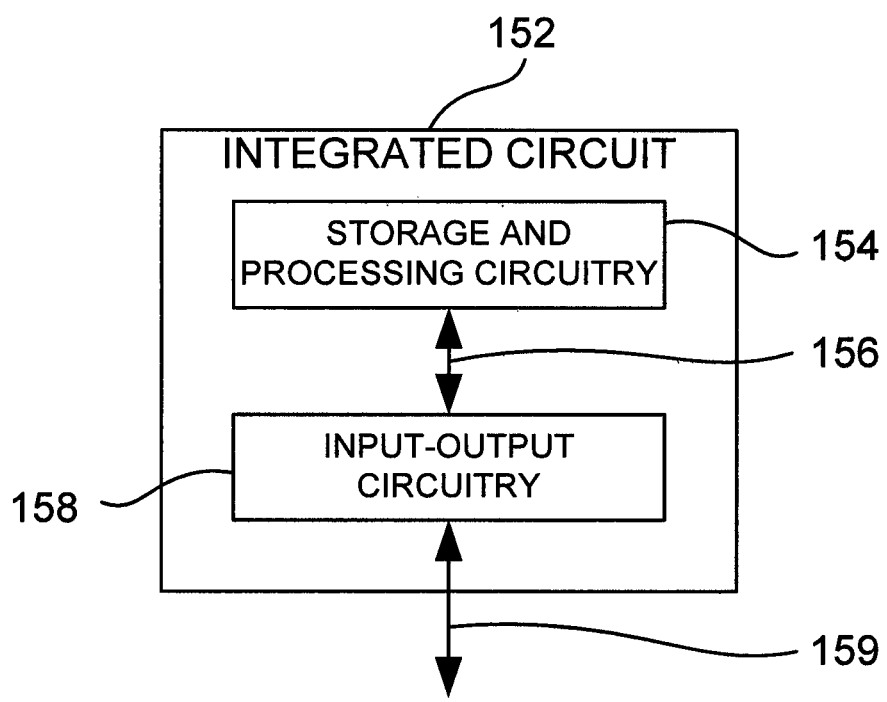
FIG. 1 is a diagram of an illustrative integrated circuit in accordance with an embodiment.

An illustrative embodiment of an integrated circuit 152 in accordance with the present invention is shown in FIG. 1.

Integrated circuit 152 may include storage and processing circuitry 154 and input-output circuitry 158. Storage and processing circuitry 154 may include embedded microprocessors, digital signal processors (DSP), microcontrollers, or other processing circuitry. The storage and processing circuitry 154 may further have random-access memory (RAM), first-in first-out (FIFO) circuitry, stack or last-in first-out (LIFO) circuitry, read-only memory (ROM), or other memory elements.

Input/output circuitry 158 may include parallel input/output circuitry, differential input/output circuitry, serial data transceiver circuitry, or other input/output circuitry suitable to transmit and receive data. Internal interconnection resources 156 such as conductive lines and busses may be used to send data from one component to another component or to broadcast data from one component to one or more other components.

Internal interconnection resources 156 may also include network-on-chip (NoC) or other on chip interconnection resources. External interconnection resources 159 such as conductive lines and busses, optical interconnect infrastructure, or wired and wireless networks with optional intermediate switches may be used to communicate with other devices.

Figure 2:
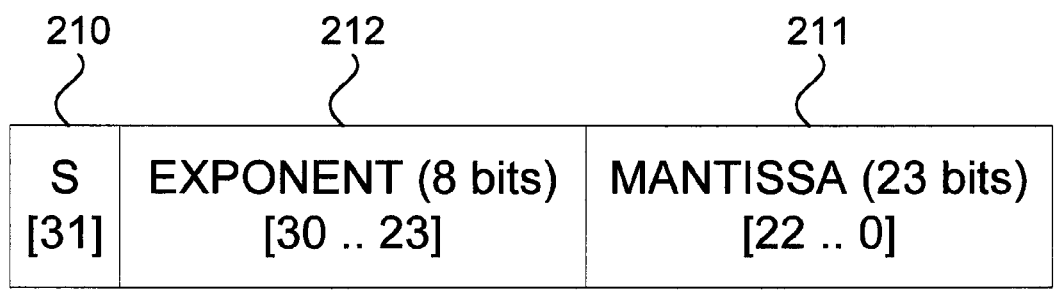
FIG. 2 is a diagram of an illustrative single precision floating-point number in accordance with an embodiment.

Floating-point numbers are commonplace for representing real numbers in scientific notation in computing systems and are designed to cover a large numeric range and diverse precision requirements. The IEEE754 standard is commonly used for floating-point numbers. A floating-point number, such as the floating-point number illustrated in FIG. 2 includes three different parts: the sign of the floating-point number 210, the mantissa 211, and the exponent 212. Each of these parts may be represented by a binary number and, in the IEEE754 format, have different bit sizes depending on the precision. For example, a single precision floating-point number such as the floating-point number in FIG. 2 requires 32 bits, which are distributed as follows: one sign bit (bit 31), eight exponent bits (bits [30:23]), and 23 mantissa bits (bits [22:0]). A double precision floating-point number requires 64 bits including one sign bit (bit 63), 11 exponent bits (bits [62:52]), and 52 mantissa bits (bits [51:0]).

According to the IEEE754 standard, a mantissa may also have additional bits. A mantissa that has additional bits is sometimes also referred to as an extended mantissa. For example, an extended, single precision mantissa may have five additional bits (i.e. an extended, single precision mantissa may consist of 28 bits instead of 23 bits). Three of those bits may be added to the right of the least significant bit to represent round, guard, and sticky bits.

Round and guard bits may provide additional accuracy when performing arithmetic operations. For example, dividing a mantissa with a '1' in the least significant bit position by two may result in the round bit to become '1'. An additional division by two may result in the guard bit to become '1'. Thus, a mantissa with round and guard bits enable the representation of numbers that are smaller than the numbers that a mantissa without these additional bits may be able to represent accurately. The sticky bit may record any bits of value '1' that are shifted beyond the precision of the mantissa by performing a logical OR operation with the round and guard bits.

The two remaining bits are added beyond the most significant bit position and may absorb any overflow produced by a floating-point arithmetic operation.

The sign of a floating-point number according to standard IEEE754 is represented using a single bit, where a "0" denotes a positive number and a "1" denotes a negative number.

The exponent of a floating-point number preferably is an unsigned binary number which, for the single precision format, ranges from 0 to 255. In order to represent a very small number, it is necessary to use negative exponents. Thus, the exponent preferably has a negative bias. For single precision floating-point numbers, the bias preferably is $-127$. For example a value of 140 for the exponent actually represents $(140-127)=13$, and a value of 100 represents $(100-127)=-27$. For double precision numbers, the exponent bias preferably is $-1023$.

As discussed above, according to the IEEE754 standard, the mantissa is a normalized number (i.e., it has no leading zeroes and represents the precision component of a floating-point number). Because the mantissa is stored in binary format, the leading bit can either be a 0 or a 1, but for a normalized number it will always be a 1. Therefore, in a system where numbers are always normalized, the leading bit need not be stored and can be implied, effectively giving the mantissa one extra bit of precision.

As discussed above, efficient implementation of floating-point operations such as the natural exponential function or the natural logarithmic function are among the most complex floating-point operations and typically use a disproportionate amount of device resources compared to arithmetic floating-point operations. For example, an integrated circuit that implements the natural exponential function or the natural logarithmic function may use storage circuits together with arithmetic operators and combinational logic and employ approximation techniques to implement those floating-point operations.

Approximation techniques for a floating-point operation may include methods that use polynomial functions (e.g., power series such as the Taylor series), which may provide a solution using a limited number of polynomials. The difference between such a solution and the exact solution may not be detectable for a given precision. In other words, the approximation with a limited amount of polynomials may provide the exact solution for a given precision.

Figure 3:
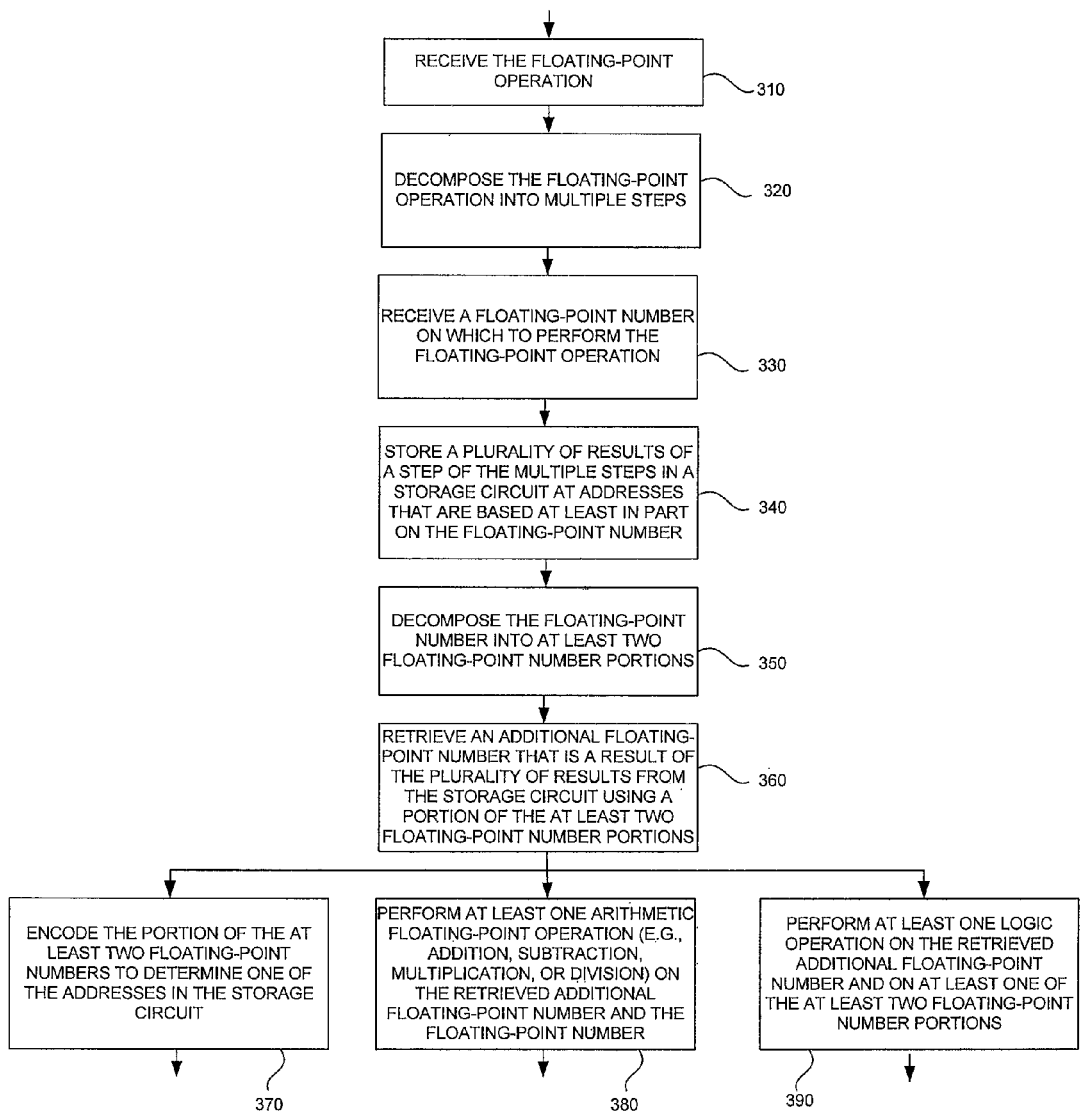
FIG. 3 is a flow chart of illustrative steps for performing a floating-point operation on a floating-point operator circuit in accordance with an embodiment.

FIG. 3 shows illustrative steps for performing a floating-point operation such as the natural exponential function or the natural logarithmic function on a floating-point operator circuit in accordance with an embodiment.

During step 310, the floating-point operator circuit may receive a floating-point operation. During step 320, the floating-point operation may be decomposed into multiple steps with the goal of allocating different steps to different portions of the floating-point operator circuit that ultimately implement the floating-point operation. For example, computing the natural exponential function of a floating-point number may be decomposed into a first step that computes the natural exponential function of the floating-point number exponent and a second step that computes the natural exponential function of the floating-point number mantissa.

During step 330, the floating-point operator circuit may receive a floating-point number on which to perform the floating-point operation. During step 340, the floating-point operator circuit may store a plurality of results of a step of the multiple steps in a storage circuit at addresses that are based at least in part on the floating-point number. The floating-point operator circuit may decompose the floating-point number into at least two floating-point number portions during step 350.

During step 360, the floating-point operator circuit may retrieve an additional floating-point number that is a result of the plurality of results from the storage circuit using a portion of the at least two floating-point number portions. For example, if desired, the floating-point operator circuit may encode the portion of the at least two floating-point numbers to determine one of the addresses in the storage circuit during step 370.

During step 380, the floating-point operator circuit may perform at least one arithmetic floating-point operation (e.g., an addition, a subtraction, a multiplication, or a division) on the retrieved additional floating-point number and the floating-point number. If desired, during step 390, the floating-point operator circuit may perform at least one logic operation. The at least one logic operation may be performed on the retrieved additional floating-point number and on at least one of the at least two floating-point number portions.

Figure 4:
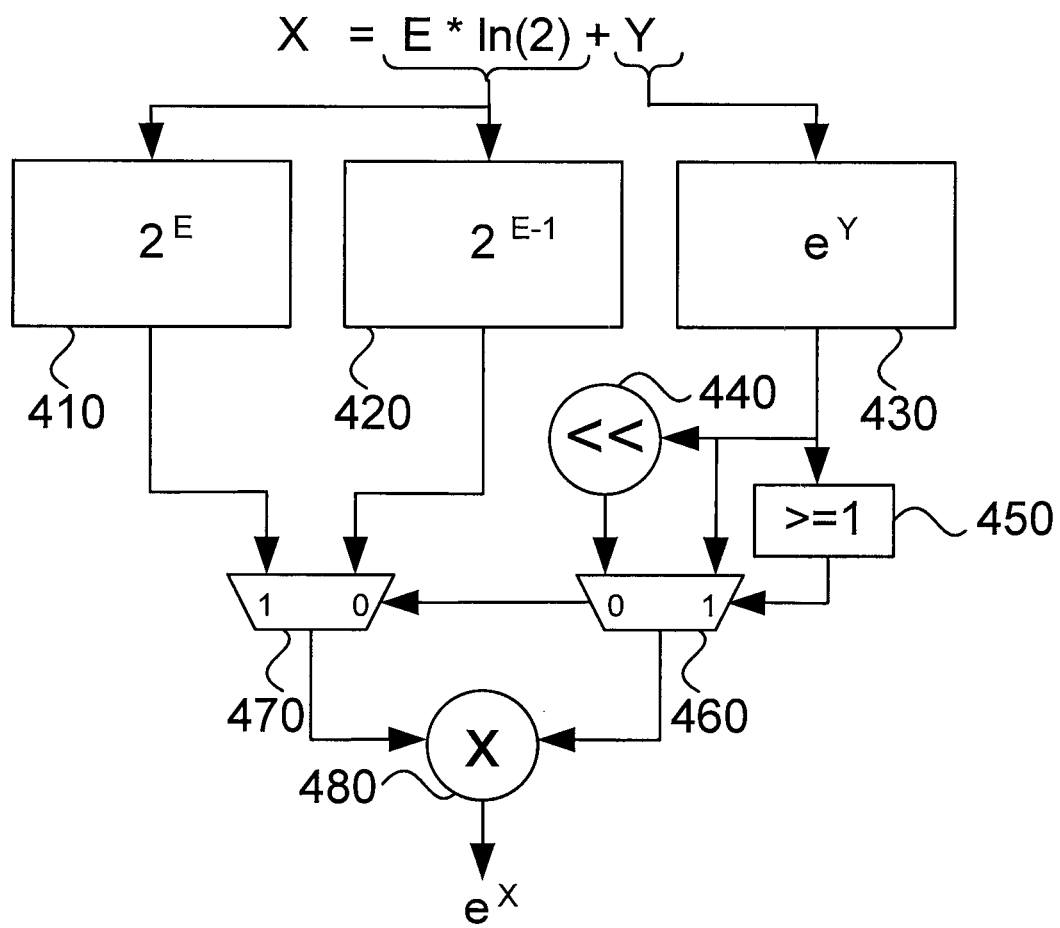
FIG. 4 is a diagram of an illustrative floating-point operator circuit that computes the natural exponential function of a floating-point number by decomposing the floating-point number into a sum of two floating-point numbers in accordance with an embodiment.

FIG. 4 shows schematically, at a high level, an embodiment of a floating-point operator circuit that computes the natural exponential function of a floating-point number using the steps outlined in the flow chart of FIG. 3.

The floating-point operator circuit of FIG. 4 may include floating-point operator sub-circuits 410, 420, and 430, left shifter 440, comparator 450, multiplexers 460 and 470, and arithmetic floating-point multiplier 480. The floating-point operator circuit may receive a floating-point number X. The floating-point number X may be decomposed into the sum as follows:

$$X = E*\ln(2) + Y \quad (1)$$

Where ln( ) is the natural logarithmic function. Using equation (1), the natural exponential function of X (i.e., e^X) may be rewritten as:

$$e^X = e^{(E*\ln(2)+Y)} = e^{(\ln(2^E))} * e^Y = 2^E * e^Y \quad (2)$$

where e is Euler's number. E may be defined as being the integer value for which the product E*ln(2) is closest to X. Thus, E may be determined by dividing X by ln(2) and then rounding the result to the closest integer value (i.e., function roundToNearestInt( )):

$$E = \text{roundToNearestInt}(X/\ln(2)) \quad (3)$$

Thus, Y is the difference of X and E*ln(2):

$$Y = X - E*\ln(2) \quad (4)$$

and because of equations (3) and (4), Y is in the interval defined by [−ln(2)/2, ln(2)/2], which implies that the natural exponential function of Y (i.e., e^Y) belongs to the approximate interval (0.7, 1.42):

$$e^{(\ln(2)/2)} = e^{(\ln(\text{sqrt}(2)))} = \text{sqrt}(2) \quad (5)$$

$$e^{(-\ln(2)/2)} = e^{(\ln(1/\text{sqrt}(2)))} = 1/\text{sqrt}(2) \quad (6)$$

where sqrt( ) is the square root function. Since e^Y belongs to the interval [0.7, 1.42], the result computed for e^X as defined in equation (2) may require normalization if e^Y is smaller than one. Thus, the normalized result of e^X according to the IEEE754 standard may be computed as:

$$e^X = 2^E * e^Y \text{ if } (1 <= e^Y) \quad (7)$$

$$e^X = 2^{(E-1)} * (2*e^Y) \text{ if } (e^Y < 1) \quad (8)$$

The floating-point operator circuit of FIG. 4 implements equations (7) and (8), thereby computing the natural exponential function of a floating-point number X and producing the resulting floating-point number at the output in a format that is compatible with the IEEE754 standard. As shown, floating-point operator sub-circuits 410 and 420 may compute 2^E from equation (7) and 2"(E−1) from equation (8) respectively.

Floating-point operator sub-circuit 430 may compute the natural exponential function of Y (i.e., e^Y), which is one of the factors of equation (7). Left shifter 440 may receive the output of floating-point operator sub-circuit 430 and shift the natural exponential function of Y (i.e., e^Y) one position to the left, thereby effectively producing (2*e^Y), which is one of the factors of equation (8).

Comparator 450 may receive the output of floating-point operator sub-circuit 430 and compare the natural exponential function of Y to one. In the event that the natural exponential function of Y is greater than or equal to one, no normalization is required. Thus, comparator 450 may produce a logical "1" and thereby direct multiplexer 460 to selectively couple the input connected to floating-point operator sub-circuit 430 to multiplier 480. Similarly, comparator 450 may direct multiplexer 470 to selectively couple the input connected to floating-point operator sub-circuit 410 to multiplier 480.

Alternatively, consider the scenario in which the natural exponential function of Y is smaller than one. In this scenario, comparator 450 may produce a logical "0" and thereby direct multiplexer 460 to selectively couple the input connected to left shifter 440 to multiplier 480. Similarly, comparator 450 may direct multiplexer 470 to selectively couple the input connected to floating-point operator sub-circuit 420 to multiplier 480.

Multiplier 480 may produce the product of the signals received from multiplexers 460 and 470. In the event that the natural exponential function of Y is greater than or equal to one, multiplier 480 may produce the product of e^Y and 2^E, thereby implementing equation (7). Alternatively, in the event that the natural exponential function of Y is smaller than one, multiplier 480 may produce the product of (2*e^Y) and 2"(E−1), thereby implementing equation (8).

In the representation of the floating-point operator circuit of FIG. 4, some elements that are shown may, in an actual embodiment, be implemented differently. For example, left shifter 440 may be replaced by a multiplier that receives the output of floating-point operator sub-circuit 430 and the constant number "2", comparator 450 may be replaced by a logic AND gate that receives the first bit in front of the comma position from floating-point operator sub-circuit 430 and a logical "1", just to name a few implementation alternatives. In addition, implementation details, such as how to determine E and Y or how to compute 2^E and e^Y, which may all be performed using conventional techniques, were omitted to simplify the discussion.

For the remainder of this description, and in an effort to not unnecessarily obscure the presented embodiments, we assume that all floating-point numbers are single precision floating-point numbers as defined by standard IEEE754. It will be recognized by one skilled in the art, that the present exemplary embodiments may be practiced using any other floating-point number format (e.g., double-precision or quadruple-precision floating-point numbers) by using different size storage blocks and by adjusting the bit width of the floating-point numbers and taking these adjustments into account when choosing mask bits and performing shift operations.

Figure 5:
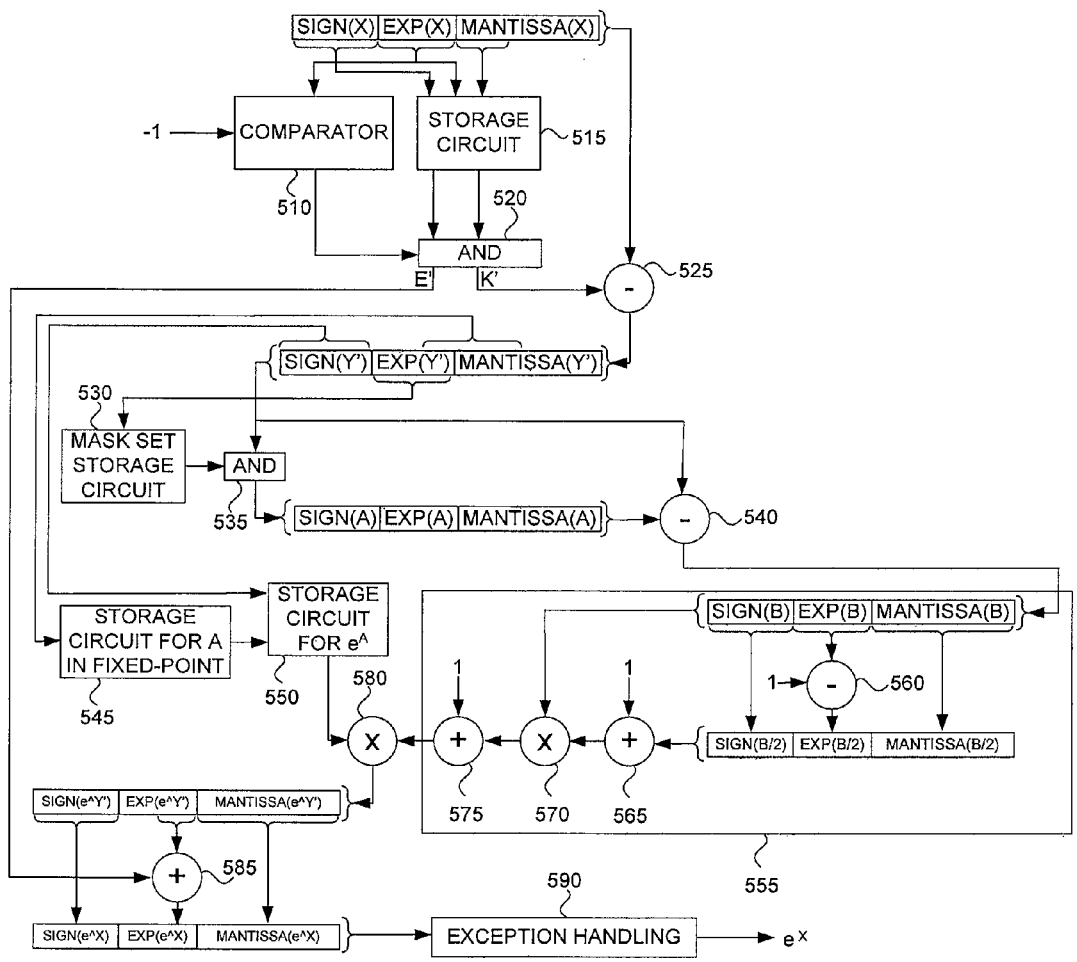
FIG. 5 is a diagram of another illustrative floating-point operator circuit that combines multiple storage circuits and arithmetic floating-point operators to compute the natural exponential function of a floating-point number in accordance with an embodiment.

FIG. 5 is another embodiment of an illustrative floating-point operator circuit that may be implemented on an integrated circuit to compute the natural exponential function of a floating-point number X. The floating-point operator circuit of FIG. 5 may receive a floating-point number X in the format defined by standard IEEE754. The computation of the natural exponential function may be based on the decomposition of floating-point number X according to equation (1). For this purpose, the floating-point operator circuit may combine multiple storage circuits, arithmetic floating-point operators, and combinational logic. For example, as shown, the floating-point operator circuit may include storage circuits 515, 530, 545, and 550, adders 565, 575, and 585, multipliers 570 and 580, subtractors 525, 540, and 560, logic AND gates 520 and 535, comparator 510, and exception handling circuit 590.

The natural exponential function of a number X may have a restricted input range. For example, the natural exponential function may be plus infinity if X is greater than an upper limit (e.g., 89.42 in single-precision floating-point). Similarly, the natural exponential function may be zero if X is smaller than a lower limit (e.g., −88.03 in single-precision floating-point). Thus, the floating-point operator circuit may have a pre-processing stage (not shown). The pre-processing stage may compare the incoming floating-point number to the upper and lower limits and produce plus infinity at an output if the incoming floating-point number is greater than the upper limit and produce zero at the output if the incoming floating-point number is smaller than the lower limit.

For the purpose of computing E of equation (3), the floating-point operator circuit may convert the floating-point number X into a fixed-point representation (e.g., X'). Since the computation of the natural exponential function of X may execute only if X is within the interval [−88.03, 89.4], the fixed-point representation of X (i.e., X') may have a limited number of bits before the radix point (e.g., eight bits using a two's complement notation where one bit represents the sign and seven bits the magnitude).

If desired, and since only the integer bits of the constant multiplication of X'*(1/ln(2)) are of interest, the size of X' may be further reduced by truncating bits after the first fractional bit. Thus, the reduced fixed-point version of X' (e.g., X") may have one sign bit, seven magnitude bits, and one fractional bit. The constant multiplication of X" and (1/ln(2)) may produce:

$$E'=X''*(1/\ln(2)) \tag{9}$$

The rounding of E' may produce a different integer value than the integer value E produced by equation (3). In fact, E' may differ by one from E in either direction. In other words, E' may lie in the interval [E−1, E+1]. Consequently, combining this with equations (3) and (4) yields Y' as shown in equation (10):

$$Y'=X-K'=X-E'*\ln(2) \tag{10}$$

Y' may lie in the interval [−ln(2), ln(2)] and thus e^Y' may lie in the interval (0.5, 2), whereas e^Y lies in the interval (0.7, 1.42) as demonstrated in equations (5) and (6). Thus, like e^Y, e^Y' only requires a maximum shift of one bit position during normalization to restore the leading one bit as required by standard IEEE754.

The floating-point operator circuit may include a barrel shifter (not shown) to determine X" (i.e., the reduced fixed-point version of X') from X. If desired, the barrel shifter may be replaced by a storage circuit (e.g., a memory array or a register table).

As mentioned above, X" may have one sign bit, seven magnitude bits, and one fractional bit. In this example, at most the seven most significant mantissa bits of floating-point number X may be part of X". Moreover, since the mantissa bits are shifted by at most seven bits, only the three least significant exponent bits of floating-point number X may be taken into consideration. Thus, a total of 11 bits of floating-point number X (i.e., the sign bit, the three least significant exponent bits, and the seven most significant mantissa bits) may be sufficient to determine X".

A storage circuit, such as storage circuit 515 of FIG. 5 may store variations of 9-bit values for X". Storage circuit 515 may be addressed by the sign bit of X (i.e., SIGN(X)), the three least significant exponent bits of X (i.e., the three least significant bits (LSBs) of EXP(X)), and the seven most significant mantissa bits of X (i.e., the seven most significant bits (MSBs) of MANTISSA(X)).

A constant multiplier that depends on nine bits may compute K' of equation (10) (i.e., K'=E'*ln(2)). If desired, floating-point values for K' may be stored in a storage block, which may reduce circuit size and latency compared to using a constant multiplier. The reduced fixed-point version of X' (i.e., X") may address the corresponding locations in the storage block during memory access operations to retrieve the associated floating-point number K' as defined in equation (10).

If desired, the storage circuit that stores floating-point numbers for K' may be merged with the storage circuit that stores the reduced fixed-point numbers X" into one single storage circuit by merging the two computation steps. Instead of determining X" from X and then determining E' and K' from X" using constant multipliers and/or storage circuits as shown above, a single storage circuit may store values for E' and K', which may be retrieved from the single storage circuit using the 11 bits of X identified above (i.e., the sign bit, the three least significant exponent bits, and the seven most significant mantissa bits of X).

For example, a storage circuit (e.g., storage circuit 515 of FIG. 5) may have address lines coupled to the 11 bits of X identified above and may store 40 bits at each storage location with the eight MSBs representing E' and the 32 LSBs representing K'. If desired, the 32 MSBs may represent K' and the eight LSBs represent E'. Alternatively, two storage circuits may share address lines which may be coupled to the 11 bits of X identified above. One storage circuit may store values for K' while the other storage circuit stores values for E'.

Consider the scenario in which the exponent of X is smaller than −1 (i.e., EXP(X)<−1). In this scenario, X" is smaller than 0.5 and thus E' may be zero (see equation (9)) and thereby K' may be zero (see equation (10)). Storage circuit 515 may have additional memory locations to store a zero for E' and K'. The zero may be accessed at addresses (i.e., X") for which E' and K' are zero. If desired, storage circuit 515 may have one additional memory location to store a zero for E' and K', and an address encoder may address the additional memory location when the exponent of X is smaller than −1.

Alternatively, comparator 510 may compare the exponent of X to −1. For example, comparator 510 may output a logic '0' if the exponent of X is smaller than −1 and output a logic '1' if the exponent of X is not smaller than −1. The output of comparator 510 may serve as a mask for the output of storage circuit 515 such that the output of storage circuit 515 is set to zero (i.e., K'=0 and E'=0) if the exponent of X is smaller than −1. As an example, logic AND gates 520 may perform a logic AND operation of the outputs of storage circuit 515 and the output of comparator 510.

Subtractor 525 may subtract K' from X to determine Y' according to equation (10). The natural exponential function of Y' (i.e., e^Y') may be computed by decomposing Y' into the sum of A and B (i.e., Y'=A+B) with:

$$e''Y'=e''(A+B)=e''A*e''B \quad (11)$$

For example, in a single-precision floating-point operation, B may be chosen from the interval [0, 2^−9). In this case, a second-order Taylor series expansion $$e^B=1+B+B^2/2 \quad (12)$$

may approximate e^B within accuracy, because the third order term in the Taylor series (i.e., B^3/6) may be smaller than 2^−29, which is smaller than the resolution of a single-precision floating-point number. Choosing B from the interval [0, 2^−9) is merely illustrative and is not intended to limit the scope of the present invention. If desired, B may be chosen from a different interval. As an example, the upper limit for B may be increased which in turn may require a higher-order Taylor series expansion, thereby trading off less circuit resources for determining e^A in exchange for more circuit resources for determining e^B. In double-precision floating-point, higher-order Taylor series expansions may be required for the same interval [0, 2^−9). Alternatively, B may be chosen from a different interval with a smaller upper limit.

Consider the scenario in which B is chosen from the interval [0, 2^−9). In this scenario, and since Y' lies in the interval [−ln(2), ln(2)], A is zero if the exponent of Y' is smaller than or equal to −9 (i.e., EXP(Y')<=−9). Furthermore, the exponent of Y' may not be greater than −1. Thus, a mask set may be applied to Y' to determine A.

In the scenario described above, the mask set may include eight different masks. For example, the mask set may include a first mask that selects the sign bit and the exponent bits of Y' if the exponent of Y' is greater than or equal to −8. The mask set may include a second, a third, a fourth, a fifth, a sixth, a seventh, and an eighth mask that select all bits that the first mask selects plus the one MSB, two MSBs, three MSBs, four MSBs, five MSBs, six MSBs, and seven MSBs of the mantissa of Y', respectively, if the exponent of Y' is equal to −7, −6, −5, −4, −3, −2, or −1, respectively. For example, the sixth mask may select all bits that the first mask selects (i.e., the sign and exponent bits of Y') and the five MSBs of the mantissa of Y', if the exponent of Y' is equal to −3.

A storage circuit such as mask set storage circuit 530 may store these mask sets. These mask sets may be accessed using addresses based on the exponent of Y' (i.e., EXP(Y')) and may be applied to Y' using logic AND gates 535 to determine A in floating-point format.

A fixed-point representation of A that includes eight fractional bits and the sign bit of Y' may address a storage circuit (e.g., storage circuit 550) to compute the natural exponential function of A (i.e., e^A) in floating-point format.

A right shifter may derive the fixed-point representation of A from Y' (not shown). Based on the scenario in which Y' lies in the interval [−ln(2), ln(2)] and B is chosen from the interval [0, 2^−9), A is zero if the exponent of Y' is smaller than or equal to −9 (i.e., if EXP(Y')<=−9). Furthermore, the exponent of Y' may not be greater than −1. Thus, concatenating the hidden "1" of Y' with the seven MSBs of the mantissa of Y' produces a fixed-point number with eight fractional bits and a zero before the radix point. For example, if the seven MSBs of the mantissa of Y' are '0111001', then the resulting fixed-point number with eight fractional bits may be 0.10111001. Shifting the resulting fixed-point number to the right may produce a fixed-point representation of A with eight fractional bits. The number of bit positions that the resulting eight bits are shifted to the right may be −1−EXP(Y'). As an example, if the exponent of Y' is equal to −4 (i.e., EXP(Y')=−4), then the fixed point number may be shifted three bit positions to the right. In the example above, shifting the fixed-point number 0.10111001 three bit positions to the right yields 0.00010111.

Alternatively, a storage circuit such as storage circuit for A in fixed-point 545 may store the eight bits that may address storage circuit 550. Storage circuit for A in fixed-point 545 may be addressed using four exponent bits of Y' and the seven MSBs of the mantissa of Y' for a total of 11 address lines.

After the decomposition of Y' into A and B and the computation of e^A, B and e^B may be computed. For example, subtractor 540 may subtract A from Y' to determine B.

Equation (12) may be rewritten using Horner's method, which is sometimes also referred to as Horner's scheme or Horner's rule, as:

$$e^B=1+B(1+B/2) \quad (13)$$

which Taylor series circuit 555 may implement.

Copying the sign and the mantissa of B and subtracting one from the exponent of B using subtractor 560 may produce the floating-point representation of B/2. Adder 565 may add one to B/2 to produce (1+B/2). Multiplying the output of adder 565 with B in multiplier 570 and adding one to the result using adder 575 may produce e^B as shown in equation (13).

Multiplying e^B computed by Taylor series circuit 555 and e^A retrieved from storage circuit 550 in multiplier 580 may compute e^Y' as defined in equation (11). As shown in connection with equation (10), Y' may lie in the interval [−ln(2), ln(2)], which implies that e^Y' lies in the interval (0.5, 2). Thus, e^Y' may require a shift of one bit position during normalization to restore the leading one bit as required by standard IEEE754. After normalization, the exponent of e^Y' may be either minus one or zero.

Computing e^X with X from equation (10) yields:

$$e^X = e^{(E'*\ln(2)+Y')} = 2AE'^*e''^{Y'} = SIGN(e^{Y'})*2^{(E'+ EXP(e^{Y'}))}*MANTISSA(e^{Y'}) \quad (14)$$

Thus, copying the sign and the mantissa of e^Y' and adding E' received from logic AND gates 520 to the exponent of e^Y' and using the result of the addition as the exponent yields the natural exponential function of X.

Exception handling circuit 590 may handle any exception that may have occurred during the computation of the natural exponential function of X.

Figure 6:
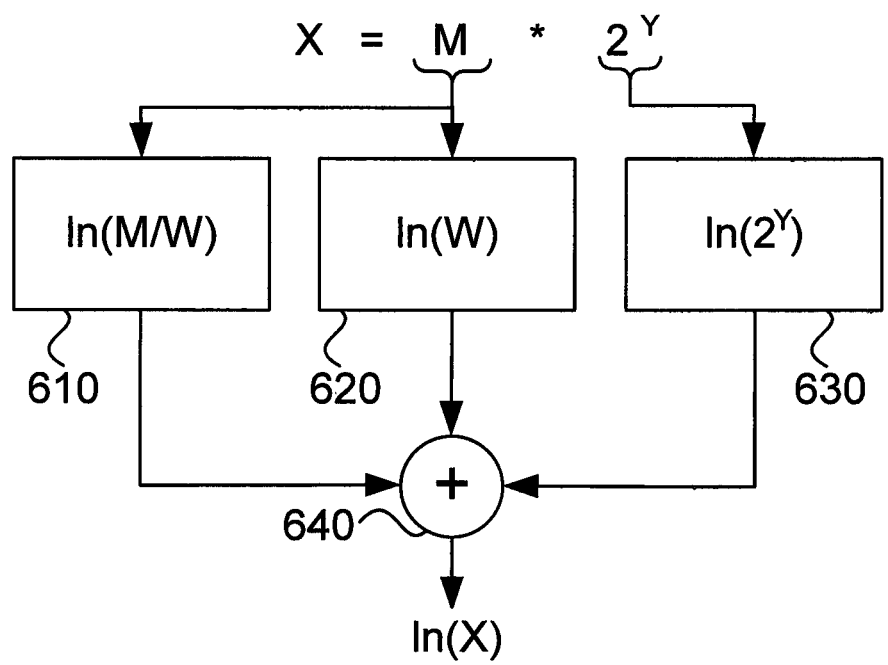
FIG. 6 is a diagram of an illustrative floating-point operator circuit that computes the natural logarithmic function of a floating-point number by decomposing the floating-point number into a product of two floating-point numbers in accordance with an embodiment.

FIGS. 4 and 5 show different embodiments of a floating-point operator circuit that computes the natural exponential function of a floating-point number. FIG. 6 shows schematically, at a high level, an embodiment of a floating-point operator circuit that computes the natural logarithmic function of a floating-point number using the steps outlined in the flow chart of FIG. 3.

The floating-point operator circuit of FIG. 6 may include floating-point operator sub-circuits 610, 620, and 630, and arithmetic floating-point adder 640. The floating-point operator circuit may receive a floating-point number X. The floating-point number X may be decomposed into the product:

$$X = M*2^Y = M/W*W*2^Y \quad (15)$$

The motivation for decomposing M further into the product of M/W*W has practical implications which may become obvious with the discussion of FIG. 7. Using equation (15), the natural logarithmic function of X (i.e., ln(X)) may be rewritten as:

$$\ln(X) = \ln(M/W*W*2^Y) = \ln(M/W) + \ln(W) + \ln(2^Y) \quad (16)$$

Thus, the floating-point operator circuit of FIG. 6 implements equation (16), thereby computing the natural logarithmic function of a floating-point number X and producing the resulting floating-point number at the output in a format that is compatible with the IEEE754 standard. As shown, floating-point operator sub-circuits 610, 620, and 630 may compute the summands ln(M/W), ln(W), and ln(2^Y) from equation (16) respectively.

Adder 640 may receive the computed natural logarithmic functions from floating-point operator sub-circuits 610, 620, and 630 and compute the sum of the signals received from the floating-point operator sub-circuits 610, 620, and 630, thereby implementing equation (16).

Figure 7A:
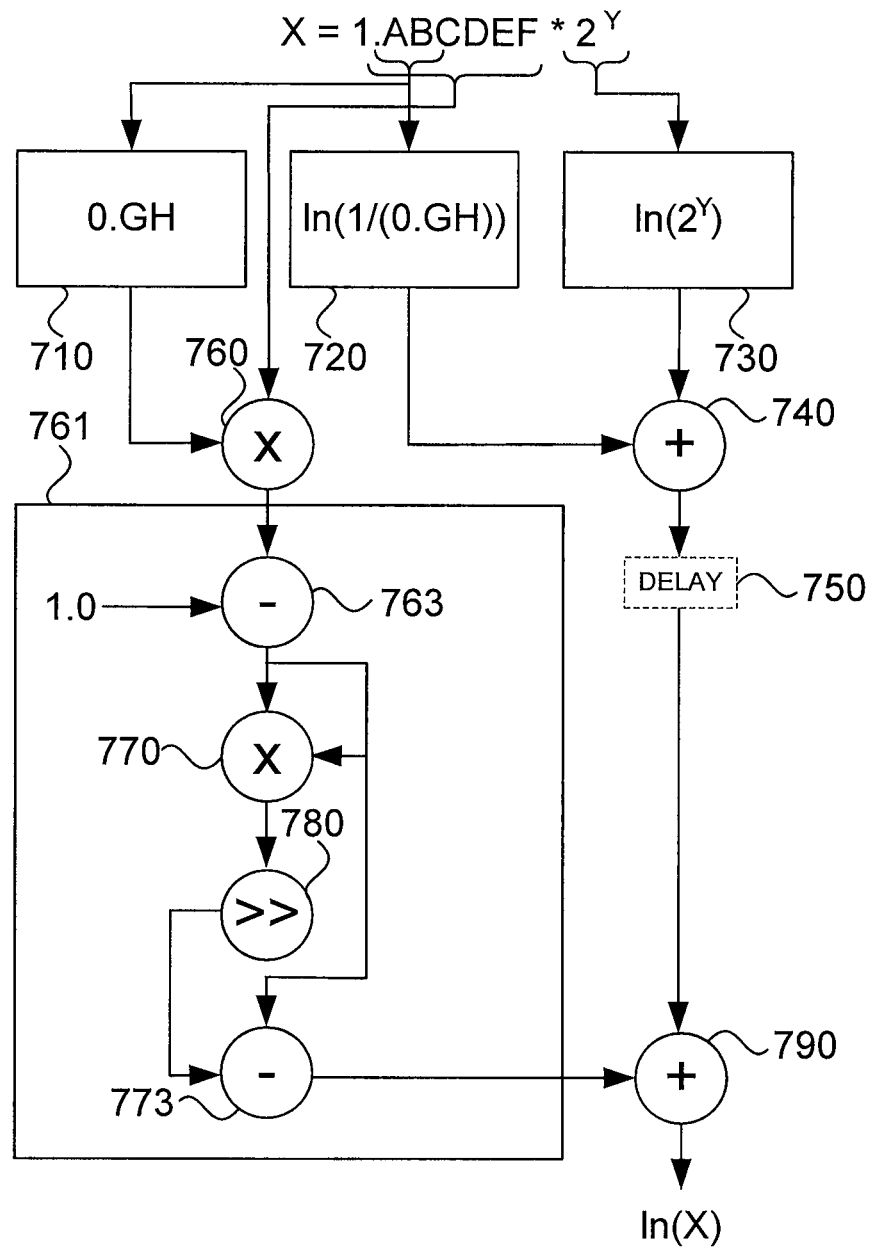
FIG. 7A is a diagram of an illustrative floating-point operator circuit that combines multiple storage circuits and arithmetic floating-point operators to compute the natural logarithmic function of a floating-point number in accordance with an embodiment.

FIG. 7A is a diagram of an illustrative floating-point operator circuit that may be implemented on an integrated circuit. The floating-point operator circuit of FIG. 7A may receive a floating-point number X in the format defined by standard IEEE754. The computation of the natural logarithmic function may be based on the decomposition of floating-point number X according to equation (16). For this purpose, the floating-point operator circuit may combine multiple storage circuits and arithmetic floating-point operators. For example, as shown, the floating-point operator circuit may include storage circuits 710, 720, and 730, adders 740 and 790, multipliers 760 and 770, subtractors 763 and 773, delay element 750, and right shifter 780. The floating-point operator circuit may further have exception handling circuitry (not shown), for example to handle the reception of a negative floating-point number.

Since X is a single precision floating-point number with one sign bit, eight exponent bits, and 23 mantissa bits, X may have the form:

$$X = 1.ABCDEF*2^Y \quad (17)$$

with Y representing the exponent of X and with each of A, B, C, D, and E representing four bits of the mantissa of X and F representing three bits of the mantissa of X. Exception handling may have discarded all negative numbers. Thus, X may have a positive sign.

The first factor of equation (17) may be further factorized into two factors. For example, for any given AB of equation (17), there may exist a number 0.GH that when multiplied with 1.ABCDEF may result in another floating-point number that has the form 1.00IJKL:

$$1.ABCDEF = 1/0.GH*1.00IJKL \quad (18)$$

with each of 0, I, J, and K representing four bits and L representing three bits and 0.GH, the reciprocal of one of the two factors, being a floating-point number according to the IEEE754 standard. If desired, 0.GH may be a fixed-point number and a fixed-point multiplier may execute the multiplication of equation (18).

Thus, combining equations (17) and (18) to compute the natural logarithmic function of X results in:

$$\ln(X) = \ln(1/0.GH) + \ln(2^Y) + \ln(1.00IJKL) \quad (19)$$

Since AB may be eight bits wide, there may be 256 possible floating-point values for 0.GH, which may be stored in storage circuit 710 and addressed by AB, and 256 possible floating-point values for ln(1/0.GH), which may be stored in storage circuit 720 and addressed by AB. If desired, storage circuits 710 and 720 may be fused together into one storage circuit (not shown) which may be addressed by AB and provide 64 bit numbers with one half of the 64 bits representing 0.GH and the other half of the 64 bits representing ln(1/0.GH).

Since, Y is also eight bits wide, ln(2^Y) may have 256 possible floating-point values as well, which may be stored in storage circuit 730 and addressed by Y. Adder 740 may compute the sum of the outputs of storage circuits 720 and 730, thereby producing the sum of the first two summands of equation (19).

The third summand of equation (19) (i.e., ln(1.00IJKL) may be computed using a Taylor series expansion since 0<1.00IJKL<2:

$$\ln(1+n) = n - n^2/2 + n^3/3 - n^4/4 + n^5/5 \quad (20)$$

with 1+n equal to 1.00IJKL. The series of equation (20) is sometimes also referred to as a Maclaurin series.

The first two terms of equation (20) may provide sufficient precision in single precision floating-point. The first eight bits of n after the radix point are all zeroes, the first 17 bits of $n^2/2$ after the radix point are all zeroes, and at least the first 25 bits of $n^3/3$ after the radix point are all zeroes. Since the mantissa in single precision floating-point is limited to 23 bits, the first two terms of equation (20) may provide sufficient precision.

Multiplier 760 may compute the product of 1.ABCDEF and 0.GH, thereby producing 1.00IJKL according to equation (18). Taylor series expansion circuit 761 may receive the product from multiplier 760 and compute ln(1.00IJKL) according to equation (20). For this purpose, subtractor 763 may compute n by subtracting one from 1.00IJKL.

Multiplier 770 may compute $n^2$ and right shifter 780 may shift $n^2$ one bit position to the right, thereby producing n^2/2. Subtractor 773 may compute ln(1+n) (i.e., ln(1.00IJKL) by subtracting n^2/2 from n according to equation (20).

Adder 790 may add all three summands of equation (19) together to produce the natural logarithmic function of the floating-point number X (i.e., ln(X)). If desired, the output of adder 740 may be delayed by delay element 750. For example, delay element 750 may include one or more registers coupled in series (e.g., pipeline registers). Having delay element 750 between adders 740 and 790 may be required to synchronize the arrival of the three summands at adder 790. For example, one or more of multipliers 760 and 770, subtractors 763 and 773, and right shifter 780 may have pipeline stages (not shown), and thus arrive delayed at adder 790 compared to the output of adder 740 if no delay element 750 would delay the output of adder 740 accordingly.

The Taylor series expansion circuit may be implemented in various different ways. Another embodiment of a floating-point operator circuit for computing the natural logarithmic function of a floating-point number X is shown in FIG. 7B.

Figure 7B:
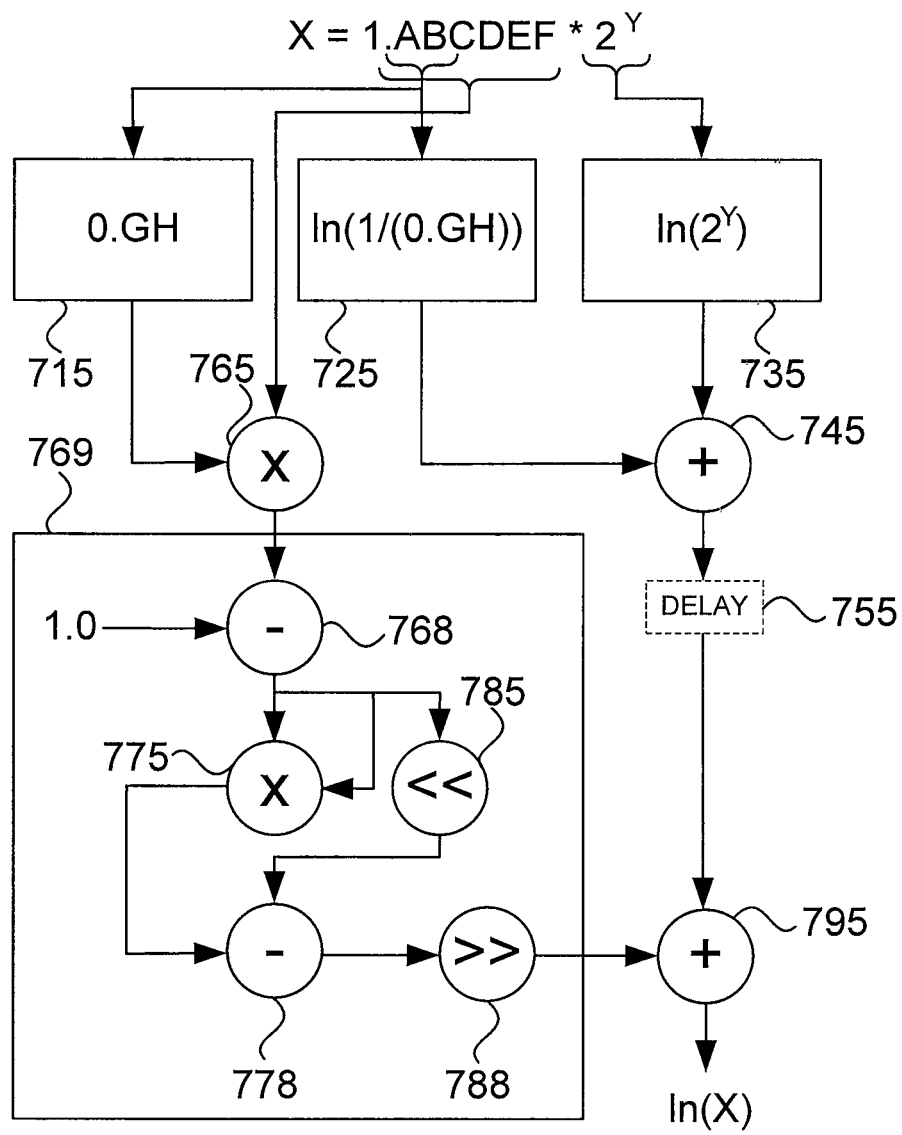
FIG. 7B is a diagram of another illustrative floating-point operator circuit that combines multiple storage circuits and arithmetic floating-point operators to compute the natural logarithmic function of a floating-point number in accordance with an embodiment.

Similar to the floating-point operator circuit of FIG. 7A, the floating-point operator circuit of FIG. 7B may combine multiple storage circuits and arithmetic floating-point operators. For example, as shown, the floating-point operator circuit may include storage circuits 715, 725, and 735, adders 745 and 795, multipliers 765 and 775, subtractors 768 and 778, delay element 755, left shifter 785, and right shifter 788. The floating-point operator circuit may further have exception handling circuitry (not shown), for example to handle the reception of a negative floating-point number.

As shown, the floating-point operator circuit may implement a functionality similar to the floating-point operator circuit of FIG. 7A. However, the Taylor series expansion circuit 769 of FIG. 7B may replace the Taylor series expansion circuit 761 of FIG. 7A. Similar to the Taylor series expansion circuit 761 of FIG. 7A, Taylor series expansion circuit 769 may receive the product from multiplier 765 and compute ln(1.00IJKL) according to equation (20). For this purpose, subtractor 768 may compute n by subtracting one from 1.00IJKL.

Multiplier 775 may compute n^2 and left shifter 785 may shift n one bit position to the left, thereby producing 2*n. Subtractor 773 may compute 2n−n^2 by subtracting the output of multiplier 775 from the output of left shifter 778. Right shifter 788 may shift 2n−n"2 one bit position to the right, thereby effectively computing n−n^2/2=ln(1+n) (i.e., ln(1.00IJKL) according to equation (20).

Figure 8:
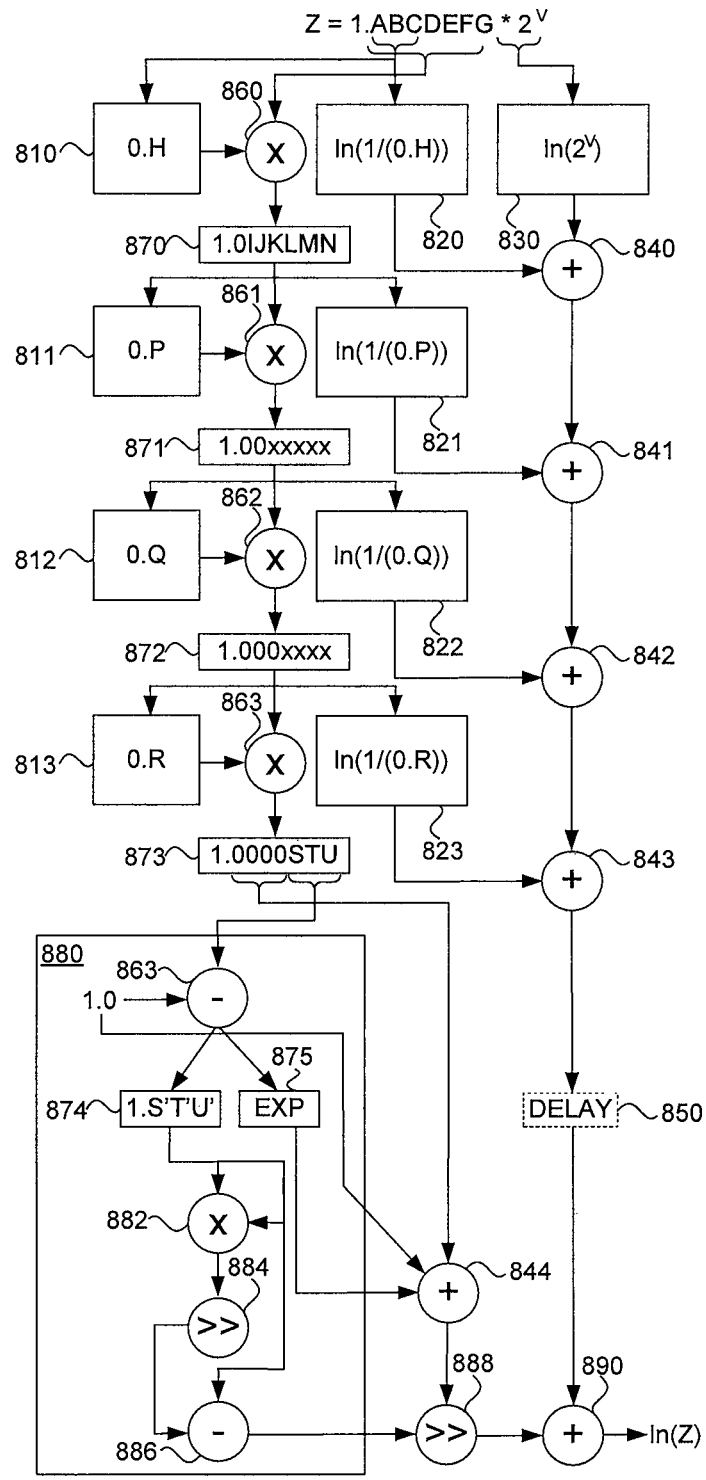
FIG. 8 is a diagram of an illustrative floating-point operator circuit that combines multiple storage circuits and arithmetic single-precision floating-point operators to compute the natural logarithmic function of a double-precision floating-point number in accordance with an embodiment.

If desired, the embodiments of the floating-point operator circuits shown in FIGS. 7A and 7B may be extended to compute the natural logarithmic function of a floating-point numbers with a higher precision such as a double-precision floating-point number or a quadruple-precision floating-point number, just to name a few. FIG. 8 shows an embodiment of an floating-point operator circuit that combines multiple storage circuits and arithmetic single-precision floating-point operators to compute the natural logarithmic function of a double-precision floating-point number.

For example, consider the scenario in which the floating-point operator circuit of FIG. 8 receives a double-precision floating-point number Z in the format defined by standard IEEE754. Since Z is a double-precision floating-point number with one sign bit, 11 exponent bits, and 52 mantissa bits, Z may have the form:

$$Z = 1.ABCDEFG * 2^V \quad (21)$$

with V representing the exponent of Z and each of A, B, C, D, E, and F representing eight bits of the mantissa of Z and G representing four bits of the mantissa of Z. Exception handling may have discarded all negative numbers. Thus, Z may have a positive sign.

The first factor of equation (21) may be further factorized. For example, for any given A of equation (21), there may exist a number 0.H that when multiplied with 1.ABCDEFG may result in another floating-point number that has the form 1.0IJKLMN:

$$1.ABCDEFG = 1/0.H * 1.0IJKLMN \quad (22)$$

with each of 0, I, J, K, L, and M representing eight bits and N representing four bits and 0.H being a floating-point number according to the IEEE754 standard. If desired, 0.H may be a fixed-point number and a fixed-point multiplier (e.g., a 53 bit×9 bit multiplier) may execute the multiplication of equation (22).

Further factorization may be performed iteratively using numbers 0.P, 0.Q, and 0.R that when iteratively multiplied with 1.0IJKLMN may result in another floating-point number that has the form 1.0000STU:

$$1.ABCDEFG = 1/0.H * 1/0.P * 1/0.Q * 1/0.R * 1.0000STU \quad (23)$$

with each of 0, S, and U representing eight bits and U representing four bits and 0.H, 0.P, 0.Q, and 0.R being floating-point numbers according to the IEEE754 standard. If desired, 0.H, 0.P, 0.Q, and 0.R may be fixed-point numbers and fixed-point multipliers may execute the multiplications of equation (23).

Thus, combining equations (21) and (23) to compute the natural logarithmic function of Z results in:

$$\ln(Z) = \ln(1/0.H) + \ln(1/0.P) + \ln(1/0.Q) + \ln(1/0.R) + \ln(2^V) + \ln(1.0000STU) \quad (24)$$

Since every iterative factorization eliminated eight bits, there may be 256 possible floating-point values for 0.H, 0.P, 0.Q, and 0.R, respectively, which may be stored in storage circuits 810, 811, 812, and 813 and addressed by A, I, etc. If desired, there may be 256 fixed-point values for 0.H, 0.P, 0.Q, and 0.R, respectively, which may be stored in storage circuits 810, 811, 812, and 813 and addressed by A, I, etc.

There may be 256 possible floating-point values for ln(1/0.H), ln(1/0.P), ln(1/0.Q), and ln(1/0.R), which may be stored in storage circuits 820, 821, 822, and 823 and addressed by A, I, etc. Storage circuit 830 may store the possible floating-point values for ln(2^V).

The natural logarithm of 1.0000STU may be computed by computing the natural logarithmic function of 1.STU and adjusting the exponent accordingly.

Taylor series expansion circuit 880 may compute the natural logarithm of the mantissa of 1.STU according to equation (20). If desired, some or all operator circuits in Taylor series expansion circuit 880 may be single-precision floating-point operators according to the IEEE 754 standard.

Subtractor 863 may compute n according to equation (20) by subtracting one from 1.STU, which may be obtained by slicing off the last 20 bits of 1.0000STU (i.e., STU). STU has an implied leading '1' (i.e., is in the form 1.STU). If desired, subtractor 863 may be a single-precision floating-point subtractor according to the IEEE754 standard. Thus, the result of the subtraction may be represented in normalized form including mantissa 874 and biased exponent 875.

As a first example, S may be '00101000' in binary and thus 1.S'T'U' may be 1.01000TU. Exponent EXP may be 124 (i.e., −3 plus the bias of 127 as required by the IEEE754 standard for single-precision floating-point). As a second example, S may be '00000000' and T may be '00100000'. In this second example, 1.S'T'U' may be 1.00000U and exponent EXP may be 116 (i.e., −11 plus the bias of 127 as required by the IEEE754 standard).

Adder 844 may add exponent 875 (i.e., 124 in the first example and 116 in the second example) to the number of zeroes between the radix point and STU in 1.0000STU (i.e., 32) and to the bias of single-precision floating-point (e.g., 127 as defined by the IEEE754 standard). If desired, the bias may be retrieved from the exponent of 1.0. Alternatively, the bias may be provided explicitly (not shown). As a result, adder 844 may determine the sum to be 35 in the first example and 43 in the second example.

Multiplier 882 may compute $n^2$ of equation (20) and right shifter 884 may shift $n^2$ one bit position to the right, thereby producing $n^2/2$. Subtractor 886 may subtract $n^2/2$ from n according to equation (20) to produce $n-n^2/2$.

Right shifter 888 may shift the output of subtractor 886 to the right by a number of bit positions that are based on the output of adder 844. For example, the output of subtractor 886 may be shifted 35 bit positions to the right in the first example and 43 bit positions to the right in the second example, thereby producing the natural logarithm of 1.0000STU (i.e., ln(1.0000STU)) in double-precision floating-point format according to the IEEE754 standard.

Adders 840, 841, 842, 843, and 890 may add all summands of equation (24) together to produce the natural logarithmic function of the floating-point number Z (i.e., ln(Z)). Adders 840, 841, 842, 843, and 890 may perform normalization at the output to produce the sum of two double-precision floating-point numbers in a format according to the IEEE754 standard. If desired, some or all of adders 840, 841, 842, and 843 may omit normalization because the values in the additions may increase or decrease monotonically such that the correct accuracy may be maintained without normalization in exchange for an increase in mantissa precision, which may have a smaller latency than normalization. If desired, storage circuits 820-823 may store values in denormalized form.

If desired, the output of adder 843 may be delayed by delay element 850. For example, delay element 850 may include one or more registers coupled in series (e.g., pipeline registers). Having delay element 850 between adders 843 and 890 may be required to synchronize the arrival of the summands at adder 890. For example, one or more of multiplier 882, shifters 884 and 888, and subtractors 863 and 886 may have pipeline stages (not shown), and thus arrive delayed at adder 890 compared to the output of adder 843 if no delay element 850 would delay the output of adder 843 accordingly.

Figure 9:
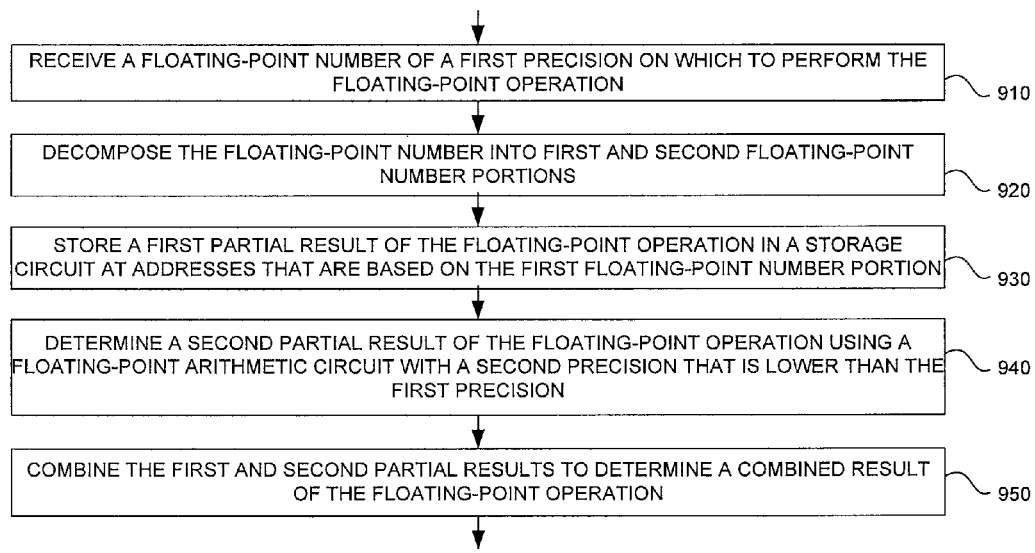
FIG. 9 is a flow chart of illustrative steps for performing a floating-point operation on a floating-point number that has a first precision using a storage circuit and a floating-point operator circuit that has a second precision that is lower than the first precision in accordance with an embodiment.

FIG. 9 is a flow chart of illustrative steps for performing a floating-point operation using a floating-point operator circuit such as the floating-point operator circuit shown in FIG. 8. During step 910, the floating-point operator circuit may receive a floating-point number of a first precision on which the floating-point operator circuit may perform the floating-point operation. As an example, the floating-point operator circuit may receive a double-precision floating-point number according to the IEEE754 standard.

During step 920, the floating-point operator circuit may decompose the floating-point number into first and second floating-point number portions. For example, the floating-point operator circuit may separate a first floating-point number portion that may include the exponent and a second floating-point number portion that may include the mantissa of the floating-point number.

During step 930, a first partial result of the floating-point operation may be stored in a storage circuit at addresses that are based on the first floating-point number portion. For example, in the event that the floating-point operation includes computing the natural logarithmic function of the floating-point number, the storage circuit may store the natural logarithmic function of two to the power of the exponent.

During step 940, the floating-point operator circuit may determine a second partial result of the floating-point operation using a floating-point arithmetic circuit with a second precision that is lower than the first precision. For example, if the floating-point number is a double-precision floating-point number according to the IEEE754 standard, the floating-point arithmetic circuit may be single-precision.

During step 950, the floating-point operator circuit may combine the first and second partial results to determine a combined result of the floating-point operation.

Figure 10:
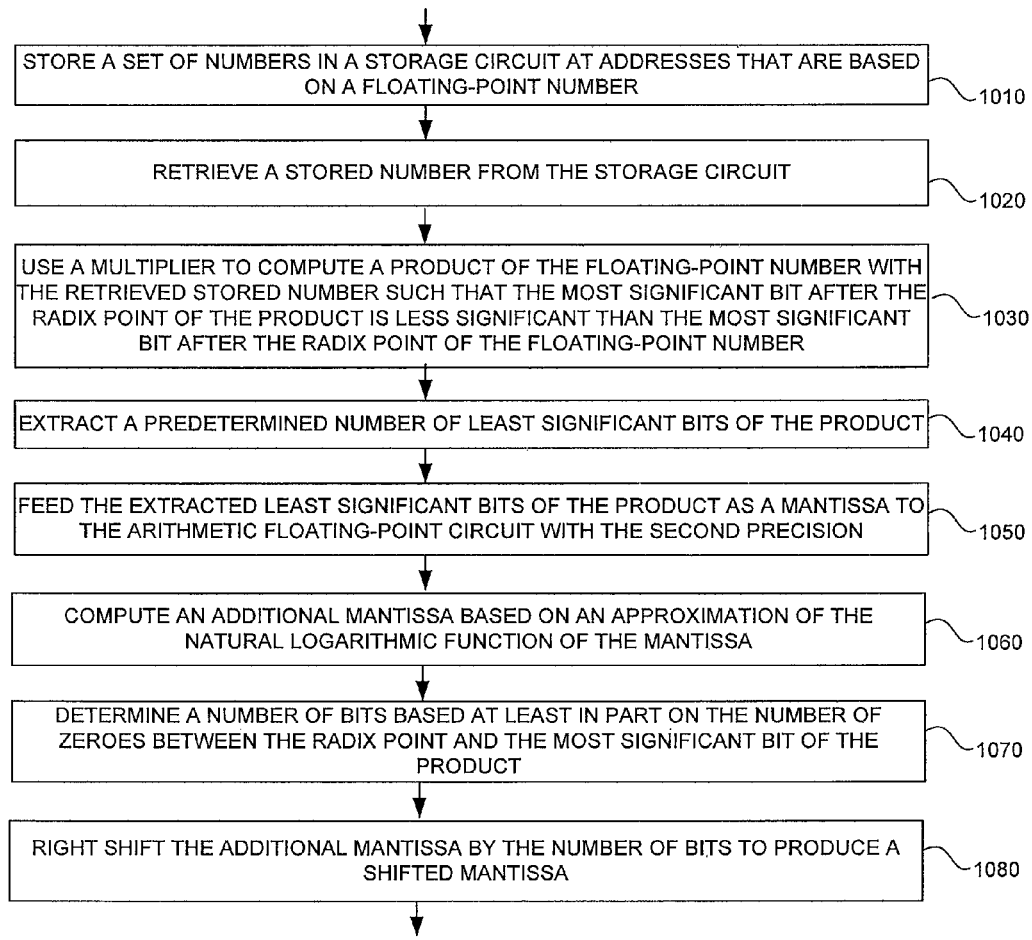
FIG. 10 is a flow chart of illustrative steps for determining a partial result of the floating-point operation of FIG. 9 in accordance with an embodiment.

FIG. 10 is a flow chart of illustrative steps for determining a partial result such as the second partial result of the floating-point operation described in FIG. 9.

During step 1010, a set of numbers may be stored in a storage circuit at addresses that are based on a floating-point number. For example, storage circuit 810 of FIG. 8 may store numbers that are addressed by a portion of the mantissa of the floating-point number.

During step 1020, the floating-point operator circuit may retrieve a stored number from the storage circuit and, during step 1030, use a multiplier to compute a product of the floating-point number with the retrieved stored number such that the most significant bit (MSB) after the radix point of the product is less significant than the MSB after the radix point of the floating-point number.

During step 1040, the floating-point operator circuit may extract a predetermined number of least significant bits of the product. As an example, the floating-point operator circuit may extract STU from the double-precision floating-point number 1.0000STU where '0', 'S', and 'I' have eight bits and 'U' has four bits.

During step 1050, the floating-point operator circuit may feed the extracted least significant bits as a mantissa to the arithmetic floating-point circuit with the second precision. For example, STU may be fed to circuitry 880 of FIG. 8 as a mantissa, which may imply a leading '1' (i.e., circuitry 880 of FIG. 8 may receive 1.STU).

During step 1060, the floating-point operator circuit may compute an additional mantissa based on an approximation of the natural logarithmic function of the mantissa. For example, Taylor series expansion circuit 880 may compute the natural logarithm of the mantissa 1.STU according to equation (20) using STU as n.

During step 1070, the floating-point operator circuit may determine a number of bits based at least in part on the number of zeroes between the radix point and the most significant bit of the product. During step 1080, the floating-point operator circuit may right shift the additional mantissa by the number of bits to produce a shifted mantissa. For example, right shifter 888 of FIG. 8 may right shift the result of the Taylor approximation by a number of bits that are based on the number of zeroes between the radix point and the most significant bit of 1.0000STU, thereby producing the natural logarithm of 1.0000STU (i.e., ln(1.0000STU)) in double-precision floating-point format according to the IEEE754 standard.

The method and apparatus described herein may be incorporated into any suitable integrated circuit or system of integrated circuits. For example, the method and apparatus may be incorporated into numerous types of devices such as microprocessors or other ICs. Exemplary ICs include programmable array logic (PAL), programmable logic arrays (PLAs), field programmable logic arrays (FPGAs), electrically programmable integrated circuits (EPLDs), electrically erasable programmable integrated circuits (EEPLDs), logic cell arrays (LCAs), field programmable gate arrays (FPGAs), application specific standard products (ASSPs), application specific integrated circuits (ASICs), digital signal processors (DSPs), graphics processing units (GPUs), just to name a few.

The integrated circuit described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where using an embedded floating-point operator circuit is desirable.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for performing a floating-point operation on an integrated circuit, comprising:
   receiving the floating-point operation;
   decomposing the floating-point operation into multiple steps;
   receiving a floating-point number on which to perform the floating-point operation;
   computing an intermediate result based on the floating point number during at least one of the multiple steps; and
   updating a storage circuit by storing the intermediate result at an address that is based on the received floating-point number.

2. The method of claim 1, further comprising:
   decomposing the floating-point number into at least two floating-point number portions; and
   retrieving the intermediate result from the storage circuit using a portion of the at least two floating-point number portions.

3. The method of claim 2, wherein retrieving the intermediate result further comprises:
   encoding the portion to determine one of the addresses in the storage circuit.

4. The method of claim 2, further comprising:
   performing an arithmetic floating-point operation on the floating-point number and the intermediate result.

5. The method of claim 4, wherein the floating-point arithmetic operation is selected from the group consisting of: floating-point addition, floating-point subtraction, floating-point multiplication, and floating-point division.

6. The method of claim 2, further comprising:
   performing a logic operation on the intermediate result and at least one of the at least two floating-point number portions.

7. The method of claim 1, wherein the floating-point operation comprises the natural exponential function of the floating-point number.

8. The method of claim 1, wherein the floating-point operation comprises the natural logarithmic function of the floating-point number.

9. Circuitry for calculating a natural exponential function of a first floating-point number having a sign, an exponent, and a mantissa, comprising:
   a first circuit that receives the first floating-point number, wherein the first circuit produces a first component of the natural exponential function of the first floating-point number;
   a second circuit that receives the first floating-point number, wherein the second circuit produces a second component of the natural exponential function of the first floating point number; and
   a floating-point arithmetic circuit that receives the first component from the first circuit and the second component from the second circuit and that performs a floating-point arithmetic operation on the first and second components to compute a second floating-point number that represents the natural exponential function of the first floating-point number.

10. The circuitry of claim 9, wherein the first circuit further comprises:
    a storage circuit that stores intermediate results, wherein each intermediate result is stored at an address that is based on at least a portion of the first floating-point number.

11. The circuitry of claim 10, wherein the intermediate results comprise additional floating-point numbers.

12. The circuitry of claim 10, wherein the first circuit further comprises:
    enable circuitry that receives first and second signals, wherein the first signal is based on the exponent of the first floating-point number, wherein the second signal is one of the stored intermediate results, and wherein the enable circuitry outputs a third floating-point number that is based on the first and second signals.

13. The circuitry of claim 12, wherein the second circuit further comprises:
    a floating-point subtractor that receives the first and third floating-point numbers, wherein the floating-point subtractor computes a fourth floating-point number based on the difference between the first and third floating-point numbers.

14. The circuitry of claim 13, wherein the second circuit further comprises:
    decomposition circuitry that receives the fourth floating-point number from the floating-point subtractor and decomposes the fourth floating-point number into a sum of fifth and sixth floating-point numbers, wherein the second component received by the floating point arithmetic circuit is computed based on the fifth and sixth floating point numbers.

15. The circuitry of claim 14, wherein the fifth and sixth floating-point numbers have the same sign and the same exponent as the fourth floating-point number.

16. The circuitry of claim 14, wherein the second circuit further comprises:
    a subset of floating-point arithmetic circuits that receives the sixth floating-point number, wherein the subset of floating-point arithmetic circuits provides a seventh floating-point number that is based on the natural exponential function of the sixth floating-point number.

17. The circuitry of claim 16, wherein the subset of floating-point arithmetic circuits computes the seventh floating-point number based on a second degree Taylor series of the natural exponential function of the sixth floating-point number.

18. The circuitry of claim 17, wherein the subset of floating point arithmetic circuits comprises:
- a fixed-point subtractor;
- a floating-point multiplier;
- two floating-point adders; and
- interconnect circuitry that conveys signals between the fixed-point subtractor, the floating-point multiplier, and the two floating-point adders such that the fixed-point subtractor, the floating-point multiplier, and the two floating-point adders compute the second degree Taylor series of the natural exponential function of the sixth floating-point number using Horner's scheme.

19. The circuitry of claim 16, wherein the second circuit further comprises:
- an additional storage circuit, wherein the additional storage circuits stores additional intermediate results at addresses that are based on at least a portion of the fifth floating-point number, and wherein the additional intermediate results are based on the natural exponential function of the fifth floating-point number; and
- a floating-point multiplier that receives the seventh floating-point number and one of the additional intermediate results, wherein the floating-point multiplier computes an eighth floating-point number as the product of the seventh floating-point number and the one of the additional intermediate results, and wherein the second component received by the floating point arithmetic circuit is based on the eight floating point number.

20. Circuitry for calculating the natural logarithmic function of a first floating-point number having a sign, an exponent, and a mantissa, comprising:
- a first circuit that receives the exponent and a portion of the mantissa of the first floating-point number and that produces a second floating-point number based at least in part on the natural logarithmic function of two to the power of the exponent;
- a second circuit that receives the mantissa of the first floating-point number and that produces a third floating-point number based on a decomposition of the mantissa into at least two factors; and
- a floating-point adder coupled to the first and second circuits, that receives the second and third floating-point numbers from the first and second circuits and that computes a sum of the second and third floating-point numbers, wherein the sum represents the natural logarithmic function of the first floating-point number.

21. The circuitry of claim 20, wherein the first circuit further comprises:
- a storage circuit that stores floating-point numbers and that performs memory access operations based on the exponent.

22. The circuitry of claim 21, wherein the first circuit further comprises:
- an additional storage circuit that stores additional floating-point numbers and that performs memory access operations based on the portion of the mantissa of the first floating-point number.

23. The circuitry of claim 22, wherein the stored additional floating-point numbers are based on the natural logarithmic function of one of the at least two factors.

24. The circuitry of claim 22, wherein the first circuit further comprises:
- an additional floating-point adder that receives one of the stored floating-point numbers from the storage circuit and one of the stored additional floating-point numbers from the additional storage circuit and that produces the second floating-point number as a sum of the received floating-point numbers.

25. The circuitry of claim 20, wherein the second circuit further comprises:
- a storage circuit that stores floating-point numbers of the inverse of one of the at least two factors and that performs memory access operations based on the portion of the mantissa of the first floating-point number.

26. The circuitry of claim 25, wherein the second circuit further comprises:
- a multiplier that receives one of the stored floating-point numbers from the storage circuit and the mantissa of the first floating-point number and that produces a fourth floating-point number based on the product of the received floating-point numbers.

27. The circuitry of claim 26, wherein the second circuit further comprises:
- arithmetic floating-point circuitry that computes the third floating-point number using an approximation of the fourth floating-point number based on the Taylor series for the natural logarithmic function.

28. A method for performing a floating-point operation on an integrated circuit, comprising:
- receiving a floating-point number of a first precision on which to perform the floating-point operation;
- decomposing the floating-point number into first and second floating-point number portions;
- storing a first partial result of the floating-point operation in a storage circuit at addresses that are based on the first floating-point number portion;
- computing a second partial result of the floating-point operation using a floating-point arithmetic circuit with a second precision that is lower than the first precision; and
- combining the first and second partial results to obtain a combined result for the floating-point operation.

29. The method of claim 28, wherein computing the second partial result of the floating-point operation further comprises:
- storing a set of numbers in an additional storage circuit at addresses that are based on the second floating-point number portions.

30. The method of claim 29, further comprising:
- retrieving a stored number in the set of stored numbers from the additional storage circuit; and
- using a multiplier to compute a product of the second floating-point number portion with the retrieved stored number, wherein the most significant bit after the radix point of the product is less significant than the most significant bit after the radix point of the second floating-point number portion.

31. The method of claim 30, further comprising:
- extracting a predetermined number of least significant bits of the product; and
- feeding the extracted least significant bits of the product as a mantissa to the arithmetic floating-point circuit with the second precision.

32. The method of claim 31, further comprising:
- using the arithmetic floating-point circuit with the second precision to compute the second partial result based on an approximation of the natural logarithmic function of the mantissa.

33. The method of claim 32, wherein the approximation of the natural logarithmic function is based on a Taylor series.

34. The method of claim 32, further comprising:
determining a number of bits based at least in part on the number of zeroes between the radix point and the most significant bit of the product; and
using a right shifter to right shift an intermediate mantissa by the number of bits to produce a shifted mantissa.

35. The method of claim 34, wherein combining the first and second partial results further comprises:
using an adder to compute a sum based on the shifted mantissa and the first partial result.

36. The method of claim 35, wherein the sum is the natural logarithm of the floating-point number in the first precision.

* * * * *